Sept. 27, 1966 J. CHERNIAVSKYJ 3,275,253
MOTION PICTURE PROJECTOR
Filed Jan. 17, 1964 6 Sheets-Sheet 3
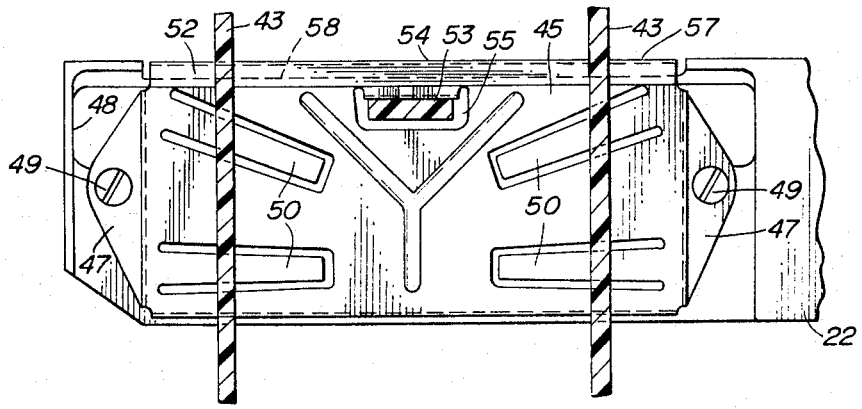
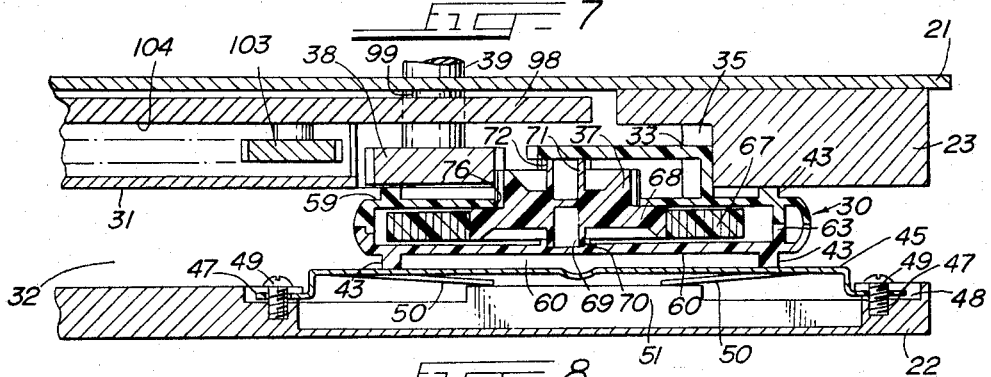
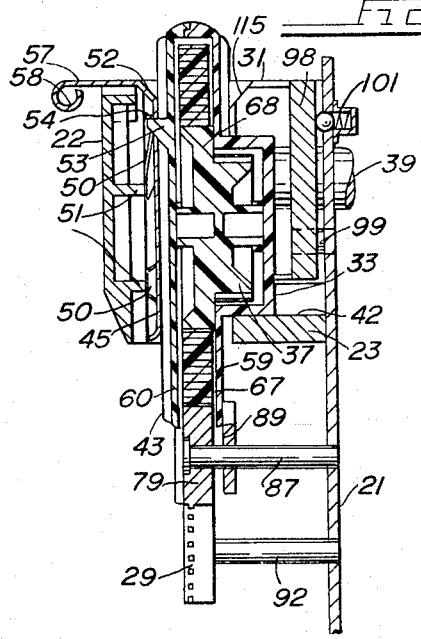
INVENTOR.
JAROSLAV CHERNIAVSKYJ
BY Barry L. Clark
ATTY.

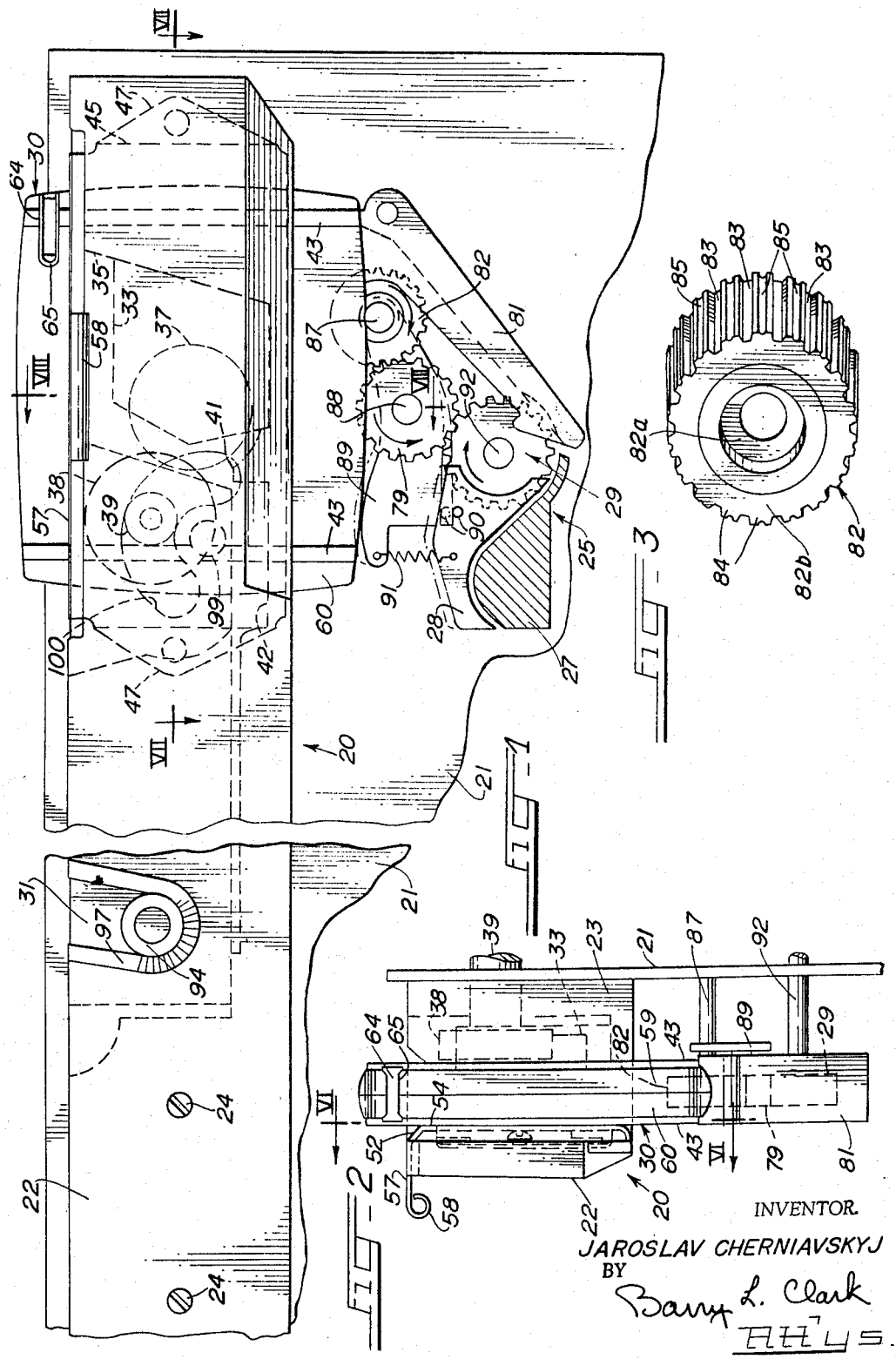

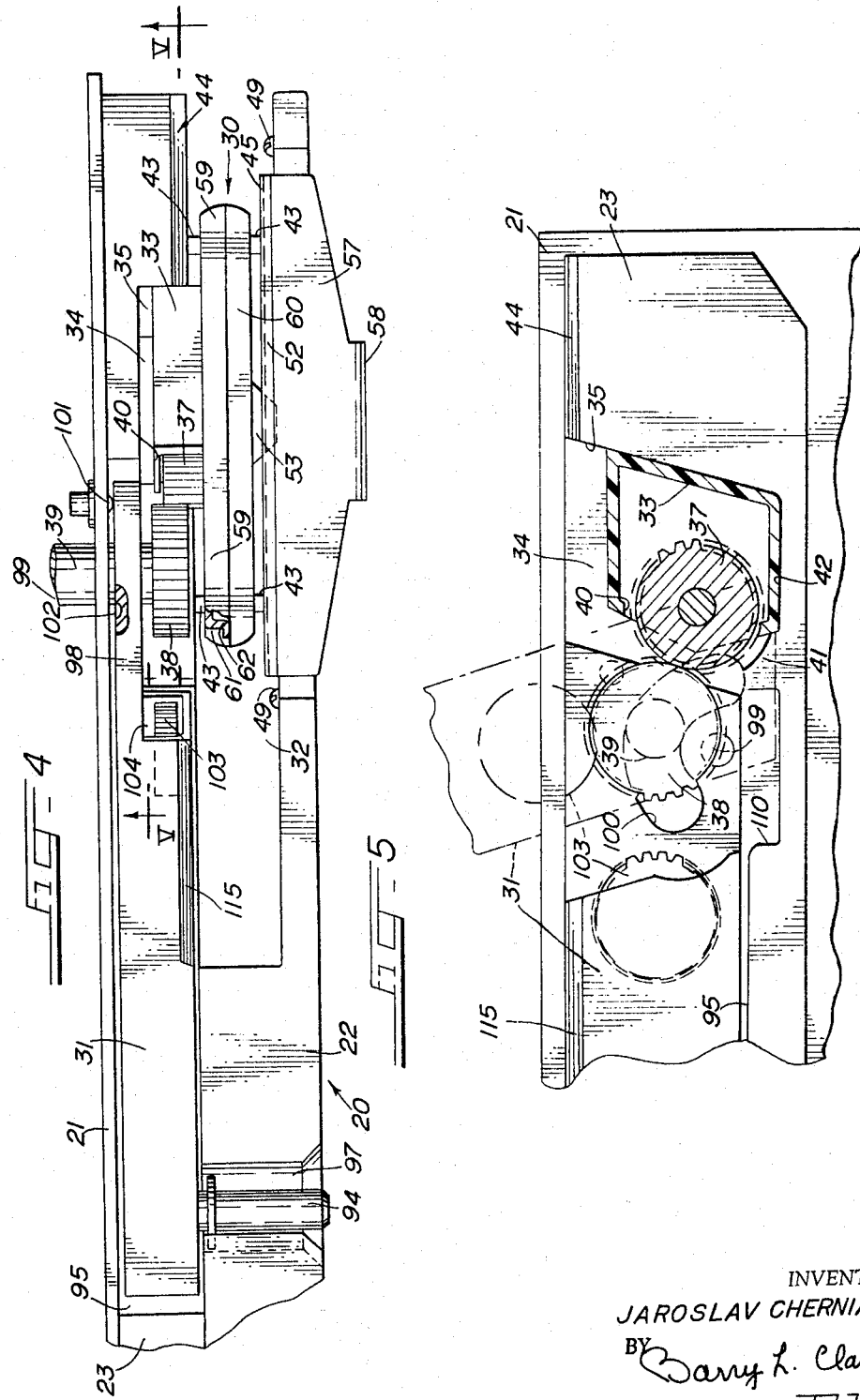

Sept. 27, 1966 J. CHERNIAVSKYJ 3,275,253
MOTION PICTURE PROJECTOR
Filed Jan. 17, 1964 6 Sheets-Sheet 4
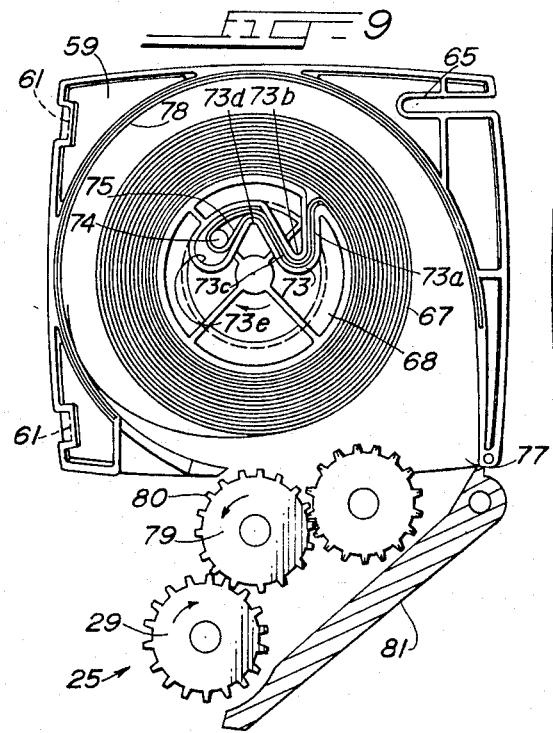
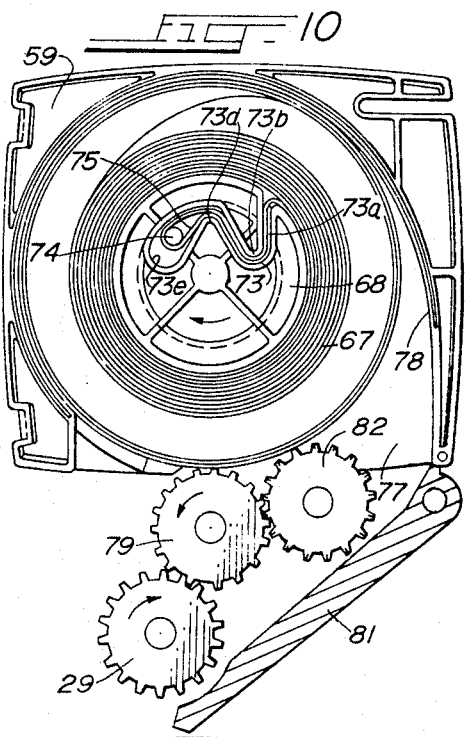
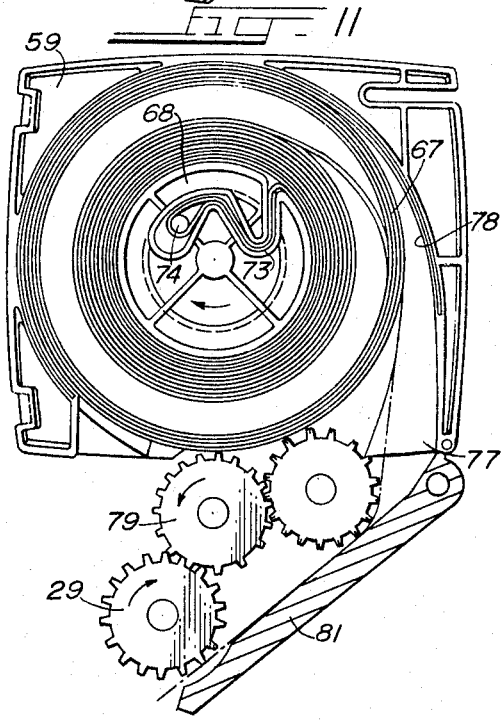
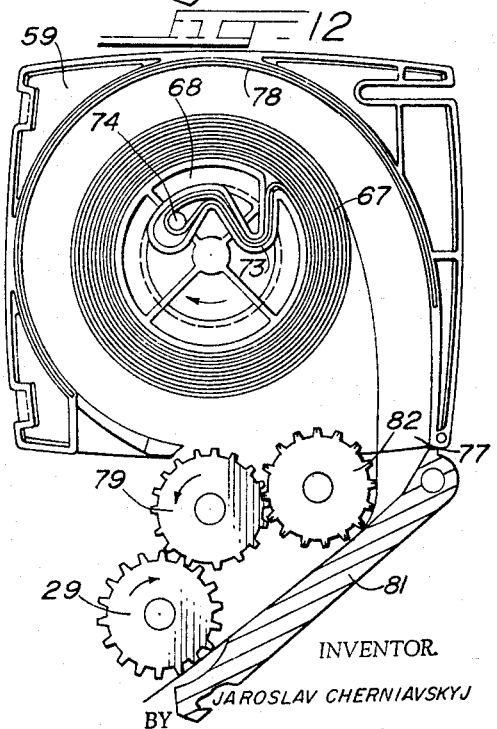
INVENTOR.
JAROSLAV CHERNIAVSKYJ
BY Barry L. Clark
ATTY.

Sept. 27, 1966  J. CHERNIAVSKYJ  3,275,253
MOTION PICTURE PROJECTOR
Filed Jan. 17, 1964  6 Sheets-Sheet 5
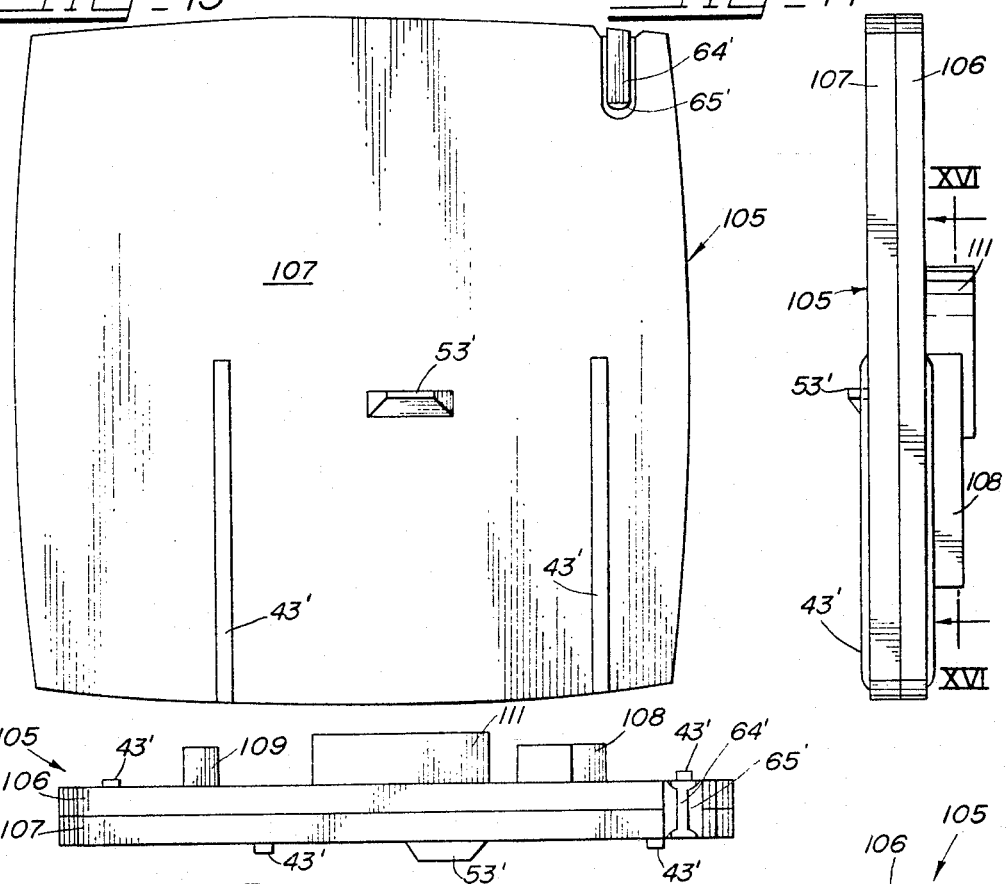
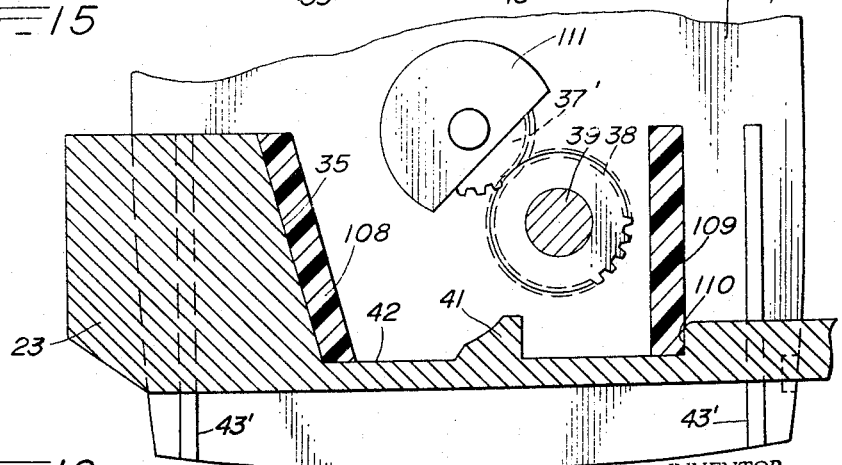
INVENTOR.
JAROSLAV CHERNIAVSKYJ
BY Barry L. Clark
ATTY

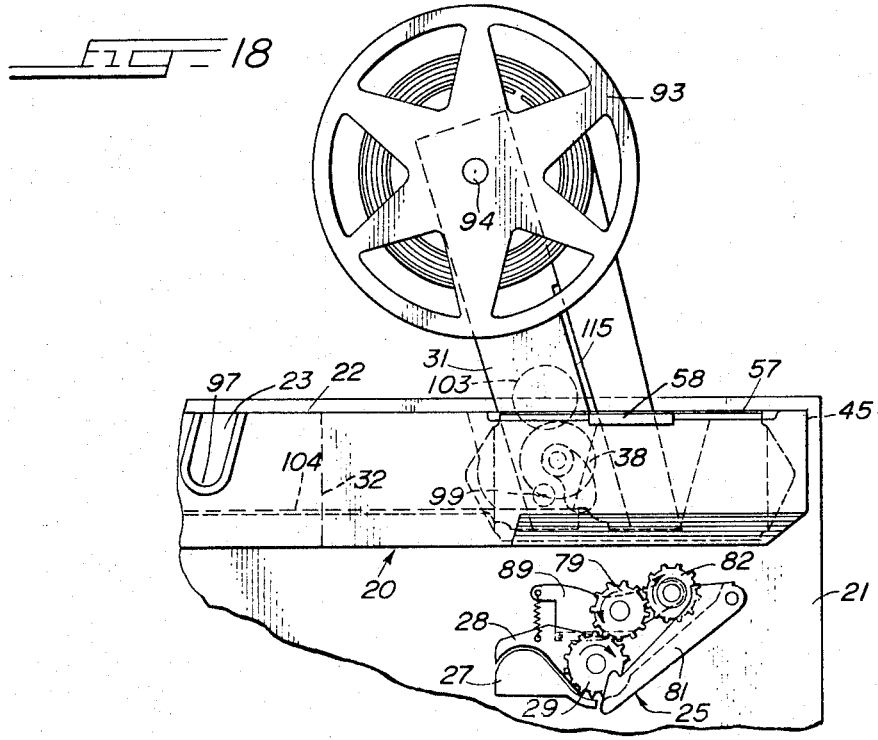
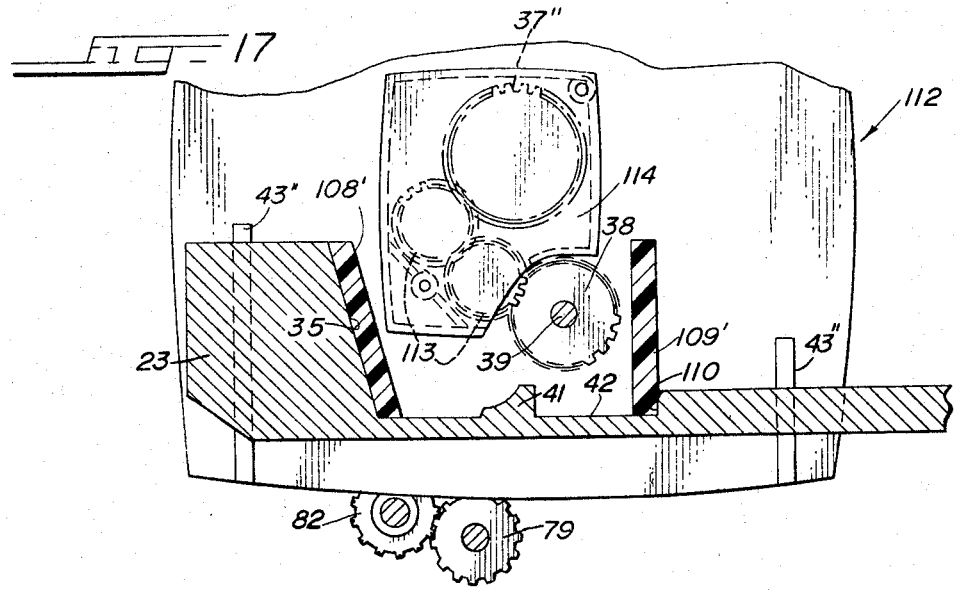

United States Patent Office 3,275,253
Patented Sept. 27, 1966

3,275,253
MOTION PICTURE PROJECTOR
Jaroslav Cherniavskyj, Skokie, Ill., assignor to Bell & Howell Company, Chicago, Ill., a corporation of Illinois
Filed Jan. 17, 1964, Ser. No. 338,429
22 Claims. (Cl. 242—55.11)

This invention relates to improvements in motion picture projectors and more particularly relates to improved means for automatically threading the film strip in such projectors, especially from film supply cartridges, but also adapted for arm-supported supply reel film handling.

In motion picture projectors, it is desirable to drive the supply reel or cartridge core in the direction of film feed for automatic film threading. As an example of a projector to which the instant invention may be applied, Patent No. 3,029,686 assigned to the same assignee as the present application, is referred to as typical and for reference as to details of a self-threading arrangement.

In initiating feed of the film strip from a supply cartridge by driving the core on which the roll of film is wound, the roll tends to expand and the outermost coil of the film strip engages the encompassing wall of the cartridge frictionally more or less bindingly. As the succeeding coils are expanded by unwinding of the film strip, jamming of the film may occur.

An important object of the present invention, therefore, is to provide new and improved means for feeding motion picture film from a cartridge for automatic threading, in such a manner as to preclude binding, seizing or jamming of the film strip within the cartridge and to assure positive advancement of the leading end of the film into the threading track.

Another object of the invention is to provide a new and improved feed and stripper roller mechanism for effecting positive feed and guidance of motion picture film strip from a cartridge into an automatic threading track.

A further object of the invention is to provide novel means for supporting a motion picture film supply cartridge in a balanced, stable relation to a driving gear for the rotary core of the cartridge and also in relation to auxiliary feed and guiding means associated with the starting end of the self-threading track of the projector.

A still further object of the invention is to provide a new and improved motion picture film supply cartridge especially adapted for self-threading of the film in the associated projector.

Still another object of the invention is to provide new and improved means in a motion picture film supply cartridge for retaining the inner end of the film strip coupled to the rotary core of the cartridge.

A yet further object of the invention is to provide novel means in a motion picture projector for accommodating different sizes of film cartridge adapted to support various lengths of film in proper relation to cartridge core driving gear means and to threading means of the projector.

Often it is desirable to be able to use the same projector in which cartridge-stored film is adapted to be projected, to project film stored on conventional reels of the kind which are customarily supported on an arm carried by the projector.

It is accordingly a further object of the invention to provide new and improved means for alternately and selectively accommodating either cartridge housed film or reel-carried film, and more especially in relation to an automatic, self-threading means.

Other objects, features and advantages of the present invention will be readily apparent from the following detailed description of certain preferred embodiments thereof taken in conjunction with the accompanying drawings, in which:

FIGURE 1 is a fragmental elevational view of a structure embodying features of the invention;
FIGURE 2 is an end elevational view looking leftward toward the right end of the structure of FIGURE 1;
FIGURE 3 is an enlarged isometric view of the stripper roller of the feeding and guide means associated with the beginning of the film threading track;
FIGURE 4 is a top plan view of the structure of FIGURE 1;
FIGURE 5 is a sectional elevational detail view taken substantially on the line V—V of FIGURE 4;
FIGURE 6 is a fragmentary sectional elevational detail view taken substantially on the line VI—VI of FIGURE 2;
FIGURE 7 is a fragmentary horizontal sectional detail view taken substantially on the line VII—VII of FIGURE 1;
FIGURE 8 is a vertical sectional detail view taken substantially on the line VIII—VIII of FIGURE 1;
FIGURES 9, 10, 11 and 12 are similar schematic sectional elevational views providing a step-by-step visualization of feeding and guiding of the film strip from a supply cartridge into the start of the film track;
FIGURE 13 is a front elevational view of a modified film cartridge adapted to accommodate a larger roll of film;
FIGURE 14 is an end elevational view of the cartridge of FIGURE 13;
FIGURE 15 is a top plan view of the cartridge of FIGURE 13;
FIGURE 16 is a fragmentary vertical sectional elevational detail view taken substantially on the line XVI—XVI of FIGURE 14 and disclosing the relationship of the drive gear and supporting means to the rear of the cartridge;
FIGURE 17 is a rear elevational sectional detail view similar to FIGURE 16 but showing a still larger cartridge supported in operative position for automatic film feeding and threading; and
FIGURE 18 is a small scale front elevational view of the structure of FIGURE 1 but showing the reel-supporting arm in use.

In FIGURES 1-8, is depicted one embodiment of the invention wherein a combination film supply cartridge and reel-carrying arm supporting structure 20 is mounted on a suitable supporting frame comprising a vertical plate or panel 21. In this instance, the supporting structure 20 comprises horizontal, parallel, coextensive front and rear support bars 22 and 23 secured together as by means of screws 24, although the bars may be constructed as a one-piece molding, casting or machined part, if preferred. The bar-like supporting structure 20 is mounted horizontally adjacent to the top of the supporting panel 21 and in suitable overlying relation to automatic, self-threading film track mechanism 25 including a lower upwardly arched fixed track defining member 27 and an upper complementary track defining releasable looper member 28 (see Patent No. 3,029,686). At the rear entrance of the film path track defined between the members 27 and 28, a film driving sprocket 29 is rotatably mounted and suitably drivingly connected to the drive mechanism of the associated projector for driving motion picture film into and through the film track during threading and film feeding.

Means are provided by the supporting structure 20 for supporting a film supply cartridge 30 and a supply film reel mounting arm 31 for alternate, selective use in supporting film to be guided through the film track mechanism 25. To this end, the supporting bar members 22 and 23 define between them, and preferably as a rabbeted recess in the forwardmost member 22, a vertical clearance slot 32 of suitable length over the film track mechanism 25. Within this slot 32 is accommodated the cartridge 30 supported by the member 23.

Means are provided on the support bar member 23 and on the cartridge 30 for supporting interengagement by a generally downward assembly movement of the cartridge into mounted position. A desirable arrangement comprises a rearwardly projecting integral boss structure 33 on the cartridge casing which is received in a complementary socket recess 34 in the face of the support bar 23 defining the rear side of the slot 32. Since the cartridge 30 is of the small size to accommodate a 50-foot film roll, a diagonal lead-in wall 35 defining the herein right-hand side of the socket 34 is engageable by a complementary oblique side wall of the boss 33 in order to lead film core spur gear 37 into proper meshing engagement with a driving gear 38 corotative on a driven shaft 39 journaled through the mechanism mounting plate 21 and adapted to be driven in known manner in the operation of the motion picture machine through driving mechanism (not shown) provided for this purpose. To accommodate the spur gear 37, the boss 33 is hollow and has a gear-clearing slot 40 in its left-hand wall, below which slot the boss engages a stabilizing lug 41 projecting upwardly from a bottom wall 42 defining the socket recess 34 and against which the boss 33 seats to locate the cartridge 30 at the proper elevation with respect to the threading mechanism 25.

To maintain the cartridge 30 in proper vertical plane with respect to the threading mechanism 25, and to facilitate insertion and removal of the cartridge with minimal frictional resistance and freedom from binding, respective narrow vertical contact and spacer ribs 43 are provided on both the front and back faces of the cartridge adjacent to both opposite sides. At the back of the cartridge, the ribs 43 engage against opposing vertical faces of the rear supporting bar 23 which at least adjacent to the right-hand end of the clearance slot 32 is provided along its upper front corner with a lead-in chamfer 44 to assist in entering the cartridge into the slot.

For holding the cartridge 30 firmly in place against unintentional displacement from its mounted position, yieldable pressure pad and latch means are provided. Desirably such means comprise a pressure pad plate 45 which may be formed from suitable thin sheet metal and mounted on the inner or rear side of the arm of the bar 22 defining the clearance slot 32 and opposite the socket recess 34 to oppose the mounted cartridge and press against the spacer ribs 43 on the front face of the cartridge. For this purpose, the pressure pad plate 45 is of at least slightly greater width than the cartridge 30 and has opposite side, preferably forwardly offset attachment ears 47 received in a suitable recess 48 in the inner face of the supporting bar 22 and engaged upon respective mounting pins such as screws 49 in a manner to permit a range of free movement normal to the plane of the pressure plate. Biasing means, conveniently in the form of struck-out integral forwardly projecting biasing spring fingers 50 (FIGURES 6–8) thrust against horizontal bearing ribs 51 on the bar 22, and normally urge the plate 45 rearwardly toward an extended position of less spacing between it and the opposing face of the support bar 23 than the over-all thickness of the cartridge 30 between the free engagement faces of the opposite spacer ribs 43.

On its upper margin, the pressure pad plate 45 has an upwardly and forwardly oblique lead-in chamfer 52 which at its upper end normally extends to a sufficiently spaced relation to the support bar 23 to facilitate camming reception of the lower end of the cartridge 30 when assembling the cartridge with the supporting structure. Then, pushing downwardly on the cartridge causes the pressure pad plate 45 to be cammed and spaced in opposition to its biasing spring fingers 50 to receive the cartridge into mounted position.

In the final increment of movement of the cartridge into the mounted position, a latch detent lug 53 projecting forwardly on the front wall of the cartridge casing cams with its lower cam surface against the chamfer 52, displacing the upper portion of the pressure plate 45 forwardly until the latch lug clears a keeper shoulder 54 provided by a narrow forwardly turned flange defining the upper margin of a keeper aperture 55 in the pressure plate. Thereupon, the spring fingers 50 under their spring tension snap the plate rearwardly and thus interlockingly, latchingly engage the keeper flange 54 on the interlock latch lug 53. Through this arrangement, not only is the cartridge 30 held against upward displacement, but it is firmly pressed by the pressure pad plate 45 against the opposing face of the supporting bar 23 in stable vertical alignment with the subjacent threading mechanism 25.

When it is desired to remove the cartridge 30, the combination pressure pad and latch plate 45 is readily released from the cartridge by pulling forwardly on a forwardly projecting angular upper marginal reinforcing and handle flange 57, having a front projection curled handle terminal 58. Thus, by pulling forwardly on the handle flange, the plate 45 is sprung away from the cartridge 30 to release the keeper 54 from the latch lug 53, whereby the cartridge 30 can readily be lifted from the supporting structure 20.

In a practical construction, the cartridge 30 is adapted to be made as a hollow shell or casing from a suitable moldable synthetic plastic material and in two separable, complementary sections, comprising a rear section or case 59 and a front section or cover 60 (FIGURES 4 and 7). At their adjoining edges along one side, herein the left side, the case 59 has a pair of indented pockets 61 (FIGURES 4 and 9) within which retaining hook lugs 62 on the cover 60 are engageable in separable hinge-like relation. When the case 59 and cover 60 have been closed to bring their edges together, cooperating tongue and groove edge flanges 63 (FIGURE 7) stabilize the assembly, while a removable retaining clip 64 engageable in a complementary slot 65 (FIGURES 1 and 2) retains the cartridge sections against separation until the clip is removed.

Within the cartridge 30 is housed a roll of motion picture film 67 wound upon a core 68 (FIGURES 7, 8 and 9) with which the spur gear 37 is integral. For rotatable mounting of the core 68 in the cartridge, a front end hub journal 69 extends rotatably into a bearing socket 70 provided on the inner face of the front cartridge section 60, and a rearwardly extending coaxial hub journal projection 71 is rotatably received in a forwardly opening bearing socket 72 provided on the inner side of the opposing wall of the hollow mounting boss 33, there being a clearance aperture 76 in the wall of the case section 59 of the cartridge through which the spur gear 37 extends.

An improved manner of anchoring the core terminal portion of the film 67 is afforded by a reverse bend snubber grooves and pin arrangement in the core 68 (FIGURE 9). For this purpose, the core 68 is provided with a sinuous film anchoring groove slot 73 opening from the front end of the core and having one end opening from the perimeter of the core with the adjacent portion of the groove providing a leg 73a extending on a chord of the cylindrical core perimeter. Extending in a reversely tangential direction from a juncture snubber shoulder 73b with the leg 73a is a groove section 73c also disposed on a chord of the core having at its opposite end a snubber shoulder 73d facing oppositely to the snubber shoulder 73b and located at the convergence of the sides of a film loop receiving inner end or terminal enlargement 73e having its general longitudinal axis divergent from the axis of the section 73c and generally oppositely to the divergence of the leg 73a relative to the intermediate section 73c. Located rigidly in spaced relation within the terminal enlargement 73e is an anchoring bollard-like post or pin 74 about which is engaged a terminal loop portion 75 of the film tape 67 with the terminal extremity portion of the tape disposed to engage the snubber shoulder 73b. Through this arrangement, the body of the motion picture film laps over and frictionally thrusts the terminal extremity portion of the film firmly against the snubber shoulder 73b to resist pulling out of the terminal portion upon axial tension in a direction tending to pull the film from the anchoring groove 73. In addition, the snubbing engagement of the film over the shoulder 73d relieves the terminal portion from the effects of pull-out force, and secure anchorage of the terminal loop 75 about the pin 74 is assured. It will be appreciated that the terminal loop anchorage of the film in the sinuous anchoring groove 73 is such that there is actually increased snubbing anchoring grip of the terminal loop portion of the film as pulling tension increases.

As shown in FIGURE 9, film feeding rotation of the spool core 68 is clockwise within the cartridge. For guiding the leading end portion of the strip of film or the leader of the roll of film 67 toward a film passage opening 77 in the bottom edge wall of the cartridge, a modified snail guiding wall lead-out surface 78 is provided within the cartridge in suitably spaced generally encompassing relation to the core 68. Such surface comprises a portion which is generally concentric with the core axis through an arc of over 180° starting at the bottom edge of the cartridge near but spaced from the vertical axis and providing a partial bottom wall at the left of the opening 77. This portion is desirable for retaining the coil of film substantially concentric about the axis of the core 68 in the storage condition of the roll of film and to avoid warpages other than the normally expected roll curling of the film. That portion of the guide surface 78 at the right side of the opening 77 diverges from the concentric extent of the surface to a progressively greater radius and terminates in a substantially vertical position at the opening 77.

However, in the initial film feeding drive of the core 68, with the roll of film 67 fully wound within the cartridge, the outermost film loop tends to engage frictionally with the lead-out surface 78, and more particularly the concentric portion of said surface. Frictional drag of the outermost coil of the film against the surface 78 increases during continued feeding, unwinding movement of the roll of film, until the outermost coil tends to bind within the encompassing wall surface 78. To overcome such tendency, a sprocket feed roller 79 is mounted rotatably, with a chordal portion projecting into the opening 77 adjacent to the lower edge wall-forming portion of the guiding surface wall 78 whereby to engage the outer face of the outermost coil of the film roll, when expanded as a result of propulsion of the film roll in the feeding direction. Sprocket teeth 80 on the feeding roller 79 are thus engageable in the customary sprocket holes in the strip of film. For driving of the feed roller 79 in film feeding direction, that is the direction in which the film roll 67 is feedingly turned by the core 68, the sprocket teeth 80 mesh drivingly with the sprocket teeth on the film driving sprocket 29 of the film track and looper mechanism 25. Through this arrangement, the outermost coil of the film roll is positively propelled along the guide wall surface 78 in the initial feeding of the film and prevented from binding or seizing thereon.

Under feeding thrust of the feeder roller 79, the leading end of the film exits from the cartridge through the opening 77 and into a film guiding track 81 extends generally obliquely downwardly from the downwardly directed right end portion of the guide surface wall 78 of the cartridge and leading to the sprocket end of the film track defined by the looper members 27 and 28.

As the positively driven outer film coil advances under propulsion of the feed roller 79, and the leading end of the film approaches the opening 77, any tendency of such leading end to move toward the feed roller 79 due to roll curvature is counteracted by a stripper roller 82 (FIGURE 11). This roller 82 is so constructed and arranged that as the leading end of the film strip advances toward the feeder roller assembly, the end is blocked from reaching the feed roller 79 and is deflected downwardly toward the track 81. For this purpose, the roller 82 is mounted rotatably in a position above the track 81, adjacent to the on-running side of the feed roller 79 and is driven thereby in a clockwise direction, namely, in the direction of travel of the film strip end as fed from the cartridge.

In a desirable construction, the stripper roller 82 comprises a central core 82a of a suitable relatively hard material and a rim or tire 82b of a softer, elastomeric, rubber-like material of adequate coefficient of friction for guiding the advancing film toward the track 81 by engagement with the inner, emulsion-carrying face of the film without danger of scratching. This roller, however, must slip without any appreciable drag on the outer surface of the outermost coil of the film roll where it expands into engagement with the stripper roller during initial feeding motivation by driving rotation of the magazine core 68.

Driving of the stripper roller 82 by the feed roller 79 is accomplished by providing the perimeter of the rubber tire 82b with transverse grooves 83 (FIGURE 3) matching in number and depth the sprocket teeth 80 which can thus drivingly engage in the grooves against ribs 84 and propel the stripper roller synchronously. The ribs 84 deflectingly engage with the leading end of the film strip, but avoid engagement within the sprocket perforations of the film. Further, by having the deflector ribs 84 extend across the full width of the tire 82b deflecting engagement of the rib crowns with the inner face of the film strip is spread thereacross without concentration on any longitudinal area, thus minimizing any danger of scratching the image-carrying emulsion on the film. Such possible scratching is further minimized by having the deflector roller traveling at a peripheral speed synchronized with the speed at which the film is fed from the supply means. Further minimizing of contact between the periphery of the stripper roller 82 and the film and also enhancing the film end deflecting function of the roller are respective shallow grooves 85 preferably extending throughout the length of the crown of each of the ribs 84. Also, by dividing the crowns of the ribs 84 into respective pairs of narrower ribs, such crowns are rendered more flexible and thus softer, as is desirable in view of contact of this roller with the emulsion face of the film.

As depicted in FIGURES 9 through 12, progressive steps in initiating self-threading feed of the strip of film 67, from the starting position in FIGURE 9, are effected quickly and smoothly when the power controls of the associated motion picture projector are actuated for the automatic film threading cycle. In the initial unwinding, expansion of the film roll, its outer coil enters into driven engagement with the feed roller 79 as shown in FIGURE 10. Then the advancing leading end of the film strip may impinge the perimeter of the stripper roller 82, as shown in full line in FIGURE 11, which deflects it into the film threading guide track 81 as depicted in dash outline. Therein the advancing film enters into feeding engagement with the sprocket 29, as seen in FIGURE 12.

During rewinding of the film 67, the stripper roller 82 serves the desirable function of a guide over which the film runs from the threading track 81 into the film cartridge 30.

Construction and mounting of the feed roller 79 and the stripper roller 82 are such as to permit reception of these rollers within the opening 77 of the cartridge and also to enable disengagement of the feed roller 79 from the feed sprocket 29 after the threading operation. Accordingly, both of the rollers 79 and 82 are of about the same width as the strip of film 67. Suitable mounting of the rollers 79 and 82 may be, substantially as shown, wherein the stripper roller 82 is mounted on a bearing shaft 87 (FIGURE 2) while the roller 79 is mounted on a rotary bearing 88 carried by a rocker arm 89 pivotally mounted as on the shaft 87 and resting at its free end portion on a pin 90 carried by the loop former 28 and held in contact with the pin as by means of a biasing tension spring 91. Thus, when the loop former 28, which is pivoted for upward opening movement as depicted in dash outline in FIGURE 1, opens the arm 89 is correspondingly elevated to effect disengagement of the feed roller 79 from the sprocket 29. Through this arrangement, when automatic threading of the film has been completed and the loop formers are opened, the feed roller 79 and the stripper roller 82 idle and remain in that condition until the loop formers are again closed incident to automatic film threading.

Suitable drive mechanism actuates the sprocket 29 through a shaft 92 in unison with the shaft 39 by which the driving gear 38 is actuated, although after automatic threading has been effected, the sprocket 29 may continue to be driven while the gear 38 is permitted to idle and is not re-engaged with the power drive until it is desired to run the film backwards during projection or to rewind the film.

When it is desired to project film that is wound on a conventional reel 93 (FIGURE 18), use is made of the reel arm 31 having adjacent to its free end a forwardly projecting reel mounting spindle 94. When not in use, the reel arm 31 is stored in collapsed position within a reel arm storage recess 95 provided in the supporting bar member 23, with the reel spindle pin 94 accommodated in a clearance notch 97 in the bar member 22 (FIGURES 1, 4, 5, 7 and 8). Means are provided for pivotally attaching the proximal end portion of the reel arm 31 adjacent to the driving gear 38, and for this purpose the arm has a mounting flange end portion 98 pivotally connected to the mechanism plate 21 through a pivot pin or stud 99 located adjacently below the shaft 39, with the flange 98 disposed between the gear 38 and the plate 21 and clearing the shaft 39 through a generally kidney-shaped clearance slot 100. For holding the reel arm 31 releasably in erected position as shown in FIGURE 18 and in dot dash position in FIGURE 5, a suitable detent 101 is mounted on the mechanism plate 21 (FIGURES 4 and 8) and is engageable in a detent keeper recess or groove 102 in the back face of the flange 98.

Desirably, the reel mounting spindle 94 is driven by the driving gear 38 when the reel arm 31 is erected, but is disconnected from the driving gear 38 in the collapsed, stored position of the reel arm. To this end, a suitable spindle driving gear train including a terminal gear 103 is housed within a longitudinal chamber 104 in the reel arm. The terminal gear 103 is located in such relation to the reel arm pivot 99, as best seen in FIGURE 5, that in the collapsed condition of the reel arm the terminal gear 103 is spaced from the driving gear 38, and in the erected position of the reel arm the terminal gear meshes with the driving gear.

When using the reel arm 31 to support the film reel 93, the film from the roll on the supply reel is manually guided down through the clearance slot gap 32 between the supporting bars 22 and 23 and is manually guided into the threading track 81 under the stripper roller 82 until the leading end portion of the film is engaged by the sprocket 29. In this relationship the roller 82 serves as a guide in cooperation with the track 81.

While the cartridge 30 has been depicted as of the small size of about 50 feet roll capacity, it will be observed that the supporting structure 20 is constructed and arranged to accommodate larger size cartridges through suitable length of the clearance gap 32 and the construction of the mounting means for the cartridges. For example, in FIGURES 13-16 is depicted a cartridge 105 of about 200 feet roll capacity. Internally the cartridge 105 is substantially similar to the cartridge 30 with a downward opening oriented for feeding of film to the automatic threading mechanism 25. A case shell 106 and a cover shell 107 are separably retained in assembled relation by a clip 64' engaging in a slot 65'. Spacer and guide ribs 43' on the outer faces of the casing shells 106 and 107 are engageable with the opposing surfaces of the rear bar 23 and the pressure plate 45, respectively, when mounting the cartridge 105. A latching lug 53' on the cover 107 engages with the keeper shoulder of the pressure and latching plate 45. Stable vertical support for the cartridge 105 in proper relation to the feed roller 79 and the stripper roller 82 is provided by supporting means on the back of the case section 106 comprising a diagonal supporting rib 108 which engages the shoulder 35 and the supporting base or ledge 42, and a spaced vertical rib 109 which engages the supporting ledge 42 on the opposite side of the lug 41 against a centering shoulder 110 on the supporting bar 23.

Driving of a film core within the cartridge 105, which may be identical to the previously described core 68, is effected by meshing of a spur gear 37' on the core with the driving gear 38, there being a protective hood 111 over the major portion of the gear 37', substantially as shown in FIGURES 14 and 16. Through this arrangement, mounting and removal of the cartridge 105 is effected similarly as described in connection with the magazine cartridge 30.

For yet larger sizes of cartridge such as the cartridge 112 (FIGURE 17) having, for example, a capacity of 400 feet of film, support in operative position on the supporting structure 20 is effected similarly as described for the cartridge 105 for proper orientation with respect to the self-threading track and roller mechanism 25 and more particularly the feed roller 79 and the stripper roller 82. Thus, the back of the cartridge 112 is provided with the supporting ribs 108' and 109' and the spacer ribs 43''. Internally the cartridge may be of substantially similar construction as the cartridge 30 and the cartridge 105. Since the cartridge 112 is substantially larger in size, the axis of its core driving gear 37'' will, in the operatively supported position of the cartridge be spaced some distance from the driving gear 38. Accordingly, a transmission gear train 113 is provided within a hollow closure boss 114 for transmitting driving power from the gear 38 to the core gear 37''.

To assist in assembling the larger sizes of cartridge 105 and 112 on the supporting structure 20, the reel arm 31 where it borders on the cartridge receiving slot 32 has on its upper forward corner a lead-in chamfer 115 (FIGURES 4 and 5) cooperating with the chamfer 44 on the right end portion of the supporting bar 23 to guide the larger cartridges into position.

From the foregoing, it will be apparent that the present invention provides an arrangement of substantial versatility enabling the use of cartridge or reel-carried film in a motion picture projector, and especially a projector that has an automatic, self-threading mechanism.

It will be understood that modifications and variations may be effected without departing from the scope of the novel concepts of the present invention.

I claim as my invention:

1. A film feeding construction for motion picture projectors comprising, a supporting structure, means on said supporting structure for supporting a film cartridge, a film reel arm carried by the supporting structure, said film reel arm having a reel spindle and gear means for driving the spindle, a driving gear carried by the supporting structure in position to mesh with a core gear of a cartridge, said gear means of the reel arm being disengageably disposed with respect to said driving gear.

2. A film feeding construction for motion picture projectors comprising, a supporting structure, means on said supporting structure for supporting a film cartridge, a film reel arm carried by the supporting structure, said film reel arm having a reel spindle and gear means for driving the spindle, a driving gear carried by the supporting structure in position to mesh with a core gear of a cartridge, said gear means of the reel arm being disengageably disposed with respect to said driving gear, and means providing a film track and mounted to receive film fed from either a cartridge or a reel of film mounted on the reel spindle of the reel arm.

3. Means for feeding film in a motion picture projector, a supporting structure, a film track, a reel arm pivotally collapsibly mounted on the supporting structure and being erectable for supporting a reel of film in feeding position relative to the film track, a powered driving gear mounted on said supporting structure, and a reel supporting spindle and driving gear means therefor on the reel arm, said driving gear means being drivingly engageable with said driving gear in the erected position of the reel arm but separably disengaged from the driving gear in the collapsed position of the reel arm.

4. A film supply construction for motion picture projectors comprising, supporting structure, said supporting structure including a vertical slot having means therealong for supporting a cartridge therein, and a reel arm mounted pivotally on said supporting structure and having a collapsed position along said slot, said reel arm including means disposed in said collapsed position for guiding a cartridge into the slot.

5. In film supply means for a motion picture projector including film track means for guiding film from a film cartridge, supporting structure above the film track means and including means defining a vertically opening slot having a supporting ledge along one side engageable with supporting means on a film cartridge engaged in the slot, and a driving gear mounted to mesh with cartridge core gear means on a cartridge mounted in the slot for driving a film in said cartridge out of said cartridge and toward said film track means.

6. In film supply means for motion picture projector including film track means, supporting structure above the film track means and including means defining a vertically opening slot having a supporting ledge along one side engageable with supporting means on a film cartridge engaged in the slot, a driving gear mounted to mesh with cartridge core gear means on a cartridge mounted in the slot, and means along the opposite side of the slot for applying frictional pressure against a cartridge in the slot.

7. In film supply means for a motion picture projector including film track means, supporting structure above the film track means and including means defining a vertically opening slot having a supporting ledge along one side engageable with supporting means on a film cartridge engaged in the slot, a driving gear mounted to mesh with cartridge core gear means on a cartridge mounted in the slot, and latching means on said supporting structure in said slot releasably retaining a cartridge in the slot.

8. In film supply means for motion picture projector including film track means, supporting structure above the film track means and including means defining a vertically opening slot having a supporting ledge along one side engageable with supporting means on a film cartridge engaged in the slot, a driving gear mounted to mesh with cartridge core gear means on a cartridge mounted in the slot, and a combination pressure plate and latch device mounted on the supporting structure on the other side of said slot for retaining engagement with a cartridge in the slot.

9. In a motion picture projector including a self-threading device comprising a feed sprocket and a looper into which the feed sprocket is adapted to drive a strip of film, means for supporting a film supply cartridge, said cartridge including a rotatable film core, and means for automatically feeding film wound on said core from the cartridge to said sprocket comprising a film guiding track leading from an exit opening in the cartridge to the sprocket.

10. In an automatic film feed device for motion picture projectors, means for supporting a film cartridge, means defining a film threading track leading from said supporting means, and means for initiating feed of film from a cartridge carried by said supporting means and including: a rotatably mounted feed roller engageable with the outer face of the outer coil of a roll of film in the cartridge, and a rotatably mounted stripper roller engageable with the inner face of the leading end portion of the film to guide it away from the cartridge and into said guide track.

11. In an automatic film feeding device for motion picture projectors, means for supporting a film cartridge, means defining a film guide track leading from said supporting means, means for initiating feed of film from a cartridge carried by said supporting means and including: a rotatably mounted sprocket roller engageable with the outer face of the outer coil of a roll of film in the cartridge, and a rotatably mounted stripper roller engageable with the inner face of the leading end portion of the film to guide it away from the cartridge and into said guide track, and a looper structure including a feed sprocket for advancing the film strip after it has been fed into said guide track.

12. A film feed device as defined in claim 11, wherein said feed sprocket drives said feed roller.

13. A film feeding device as defined in claim 12, wherein said feed roller rotatably drives said stripper roller.

14. A film feeding device as defined in claim 11, wherein said feed roller is separably drivingly engageable with said sprocket.

15. In a motion picture projector including a self-threading device comprising a looper structure including a curved track member and a looper pivotally separably mounted relative thereto with a feed sprocket for feeding film into the looper structure, means for supporting a film cartridge above said sprocket, and means for feeding film from the cartridge to the sprocket comprising a feed roller and means connecting the feed roller to said looper for engaging the feed roller drivingly with the sprocket in the closed position of the looper and disengaging the feed roller from the sprocket in the open position of the looper.

16. Means for feeding motion picture film from a cartridge, a feed roller having sprocket teeth and engageable with the outer face of a coil of film of a roll housed in the cartridge, and a stripper roller engageable with the leading end of the film to guide it away from said feed roller and being engageable with the inner emulsion surface of the film, said stripper roller having a resiliently flexible elastomeric perimeter and being provided with transverse grooves dividing it into ribs matching said feed roller sprocket teeth and engageable thereby for rotatably driving the stripper roller in the opposite direction of rotation from the feed roller.

17. Means for feeding motion picture film from a cartridge, a feed roller having sprocket teeth and engageable with the outer face of a coil of film of a roll housed in the cartridge, and a stripper roller engageable with the leading end of the film to guide it away from said feed roller and being engageable with the inner emulsion surface of the film, said stripper roller having a resiliently flexible elastomeric perimeter and being provided with transverse grooves dividing it into ribs matching said feed roller sprocket teeth and engageable thereby for rotatably driving the stripper roller in the opposite direction of rotation from the feed roller, the crowns of said ribs having shallow grooves therein to soften the crowns and to limit contact of the crowns with the film.

18. A motion picture projector construction comprising a vertical mechanism plate, a self-threading device carried by the plate and including a driven feed sprocket, a supporting structure mounted on the plate above said sprocket, a film cartridge carried by said supporting structure and having a downward exit opening, a core rotatably mounted in said cartridge and having a roll of film wound thereon, said core having an integral gear projecting through an opening in a wall of the cartridge, a driving gear meshing with said core gear to drive the core rotatably for feeding film from the cartridge through said opening, a film feed roller driven in unison with said sprocket and mounted in relation to said opening to engage the expanded outermost coil of film during initial feeding rotation of the core to drive such outermost coil in the direction of feed to avoid binding in the cartridge, stripper means mounted to guide the leading end portion of the film away from said feed roller upon emergence from the cartridge, and a film track leading from the cartridge opening and receptive of the leading end of the film to guide it to said sprocket.

19. A motion picture projector construction comprising an automatic film threading assembly including a feed sprocket having a feed roller meshing therewith and a stripper roller meshing with the feed roller, a film cartridge having a core therein with a roll of motion picture film wound thereon with its inner end anchored to the core, the cartridge having on one edge a film feed opening and a modified snail wall providing a surface concentric with the core for a substantial extent starting at one side of said opening and leading to a divergent portion terminating at the opposite side of said opening, said feed roller being disposed with its perimeter in said opening adjacent to said concentric wall portion and said stripper roller being disposed in said opening between said feed roller and said divergent wall portion, said feed roller being engageable with the outermost coil of the roll of film after expansion thereof by feeding rotation of the core to drive said outermost coil feedingly and avoid binding thereof on said wall and said stripper roller guiding the leading end portion of the film out of said opening, and a track receptive of the leading end of the film to guide it to said sprocket.

20. A rotatable film spool including a molded film carrying core, said core having a film end anchoring groove of sinuous shape including a plurality of oppositely divergently extending portions with snubber shoulders at junctures of the portions, one end of the groove opening through the perimeter of the core and the other end of the groove being blind ended and including an enlarged area having disposed therein an anchoring post about which a terminal loop engaged in said groove is adapted to be anchored.

21. For use in a self-threading motion picture projector, a film cartridge having therein a rotatably mounted film carrying core, said core having a film end anchoring groove of sinuous shape including a plurality of oppositely divergently extending portions with snubber shoulders at junctures of the portions, one end of the groove opening through the perimeter of the core and the other end of the groove being blind ended and including an enlarged area having disposed therein an anchoring post about which a terminal loop engaged in said groove is adapted to be anchored.

22. For use in a motion picture projector, a film supply cartridge comprising separable case and cover sections having edge flanges defining film roll encompassing walls affording a film exit opening along one edge of the cartridge, complementary separable interengaging hinge means on said sections along another edge of the cartridge, separable clip means holding the sections assembled, a film roll supporting core within the cartridge, bearing means on said sections rotatably mounting the core, and integral gear means projecting from one end of the core, said case section having an opening therein passing the gear means and exposing the gear means for meshing with a driving gear.

References Cited by the Examiner
UNITED STATES PATENTS

| | | | |
|---|---|---|---|
| 1,747,656 | 2/1930 | Ausloos et al. | 352—78 X |
| 2,189,547 | 2/1940 | Fischer | 242—74 |
| 2,539,521 | 1/1951 | Owens | 242—55.13 |
| 2,624,574 | 1/1953 | Camras | 226—183 X |
| 3,008,661 | 11/1961 | Estes et al. | 242—55.13 |
| 3,137,201 | 6/1964 | Uterhart | 226—91 |
| 3,208,682 | 9/1965 | Pastor et al. | 242—55.13 X |

FOREIGN PATENTS 568,644  11/1957  Italy.

FRANK J. COHEN, *Primary Examiner.*
MERVIN STEIN, *Examiner.*
L. D. CHRISTIAN, *Assistant Examiner.*